United States Patent
Soja et al.

(10) Patent No.: US 10,223,294 B2
(45) Date of Patent: Mar. 5, 2019

(54) FAST SECURE BOOT FROM EMBEDDED FLASH MEMORY

(71) Applicant: Freescale Semiconductor, Inc., Austin, TX (US)

(72) Inventors: Richard Soja, Austin, TX (US); James A. Stephens, Chandler, AZ (US)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 14/842,121

(22) Filed: Sep. 1, 2015

(65) Prior Publication Data
US 2017/0060781 A1    Mar. 2, 2017

(51) Int. Cl.
| | |
|---|---|
| G06F 12/00 | (2006.01) |
| G06F 13/00 | (2006.01) |
| G06F 13/28 | (2006.01) |
| G06F 12/14 | (2006.01) |
| G06F 21/62 | (2013.01) |
| G06F 9/4401 | (2018.01) |
| G06F 21/34 | (2013.01) |
| G06F 21/57 | (2013.01) |

(52) U.S. Cl.
CPC ........ *G06F 12/1466* (2013.01); *G06F 9/4401* (2013.01); *G06F 21/34* (2013.01); *G06F 21/575* (2013.01); *G06F 21/6218* (2013.01); *G06F 2212/1052* (2013.01); *G06F 2221/2143* (2013.01)

(58) Field of Classification Search
CPC ............. G06F 12/1466; G06F 12/1483; G06F 21/6218; G06F 21/79; G06F 2212/1052; G06F 9/4401

USPC ........................................................ 711/164
See application file for complete search history.

(56) References Cited

U.S. PATENT DOCUMENTS

| | | | |
|---|---|---|---|
| 4,817,040 A | 3/1989 | Bodley-Scott | |
| 5,155,484 A * | 10/1992 | Chambers, IV | .... G06F 12/0802 341/106 |
| 6,643,574 B1 | 11/2003 | Swart et al. | |
| 6,714,926 B1 * | 3/2004 | Benson | ................... H04L 67/02 |
| 6,742,117 B1 * | 5/2004 | Hikita | .................. G06Q 20/341 235/375 |

(Continued)

OTHER PUBLICATIONS

Notice of Allowance, U.S. Appl. No. 14/725,387, dated Jun. 2, 2017, 11 pages.

(Continued)

*Primary Examiner* — Sheng-Jen Tsai (57) ABSTRACT

A technique that reduces the startup time of a processing system authenticates a proxy for an image stored in tracked memory instead of authenticating the image stored in the tracked memory. A controller generates an alteration log authentication code based on an alteration log that is updated prior to programming the image stored in tracked memory. The controller records an alteration log authentication code in secure memory. The alteration log is indirectly related to a most recent image stored in the tracked memory. Authentication of the image of the alteration log is used as a proxy for authentication of the image stored in tracked memory, which is performed only when the tracked memory is modified. Use of the contents of the alteration log as a proxy for the contents of tracked memory accelerates the startup time of the system.

22 Claims, 4 Drawing Sheets

(56) References Cited

U.S. PATENT DOCUMENTS

| | | | |
|---|---|---|---|
| 6,823,273 B2* | 11/2004 | Ouellette | G06F 21/71 324/110 |
| 7,082,534 B2* | 7/2006 | Tardo | H04L 9/0625 380/37 |
| 7,496,586 B1* | 2/2009 | Bonwick | G06F 17/30067 |
| 7,584,350 B2 | 9/2009 | Kuhls et al. | |
| 7,673,129 B2* | 3/2010 | Rudelic | G06F 12/1433 711/202 |
| 7,725,703 B2 | 5/2010 | Hunter et al. | |
| 8,036,786 B2 | 10/2011 | Kimoto | |
| 8,051,267 B1* | 11/2011 | Chase | G06F 12/0246 707/813 |
| 8,316,237 B1* | 11/2012 | Felsher | H04L 9/0825 380/282 |
| 8,380,918 B2* | 2/2013 | Soja | G06F 12/1425 711/103 |
| 8,489,832 B1* | 7/2013 | Mundschau | H03M 7/6064 711/162 |
| 8,589,793 B2 | 11/2013 | Link, II | |
| 8,656,482 B1* | 2/2014 | Tosa | H04L 63/08 713/153 |
| 8,813,230 B2 | 8/2014 | Fanton et al. | |
| 8,838,678 B1* | 9/2014 | Weiss | G06F 17/3089 709/203 |
| 8,887,159 B2* | 11/2014 | Takahashi | G06F 9/4843 718/100 |
| 8,966,248 B2 | 2/2015 | Baltes et al. | |
| 8,984,632 B1* | 3/2015 | Laffoon | H04L 67/34 713/187 |
| 9,253,200 B2 | 2/2016 | Schwarz et al. | |
| 9,374,335 B2 | 6/2016 | Burcham et al. | |
| 9,436,456 B2 | 9/2016 | Danne et al. | |
| 2002/0038429 A1* | 3/2002 | Smeets | G06F 12/1408 713/193 |
| 2003/0069902 A1* | 4/2003 | Narang | G06F 17/30551 |
| 2004/0024644 A1* | 2/2004 | Gui | G06Q 10/08 705/22 |
| 2004/0193818 A1* | 9/2004 | Hashimoto | G06F 12/1433 711/164 |
| 2004/0255145 A1* | 12/2004 | Chow | G06F 12/1466 726/16 |
| 2005/0055621 A1* | 3/2005 | Adelmann | G06F 11/1008 714/758 |
| 2005/0154874 A1* | 7/2005 | Koga | H04B 1/00 713/150 |
| 2005/0256811 A1* | 11/2005 | Pagel | G07B 17/0008 705/401 |
| 2005/0262061 A1* | 11/2005 | Moritsu | H04L 63/0823 |
| 2006/0105739 A1* | 5/2006 | Frank | G06Q 30/0284 455/408 |
| 2006/0107306 A1* | 5/2006 | Thirumalai | G06Q 30/04 726/1 |
| 2006/0107329 A1* | 5/2006 | Frank | G06F 21/575 726/26 |
| 2006/0112384 A1* | 5/2006 | Frank | G06F 21/572 717/168 |
| 2006/0117190 A1* | 6/2006 | Morita | G06Q 20/341 713/193 |
| 2006/0165227 A1* | 7/2006 | Steeb | G06F 21/10 379/201.03 |
| 2007/0061535 A1* | 3/2007 | Xu | G06F 21/10 711/167 |
| 2007/0100886 A1* | 5/2007 | Steeb | G06Q 30/06 |
| 2007/0192824 A1* | 8/2007 | Frank | H04L 9/32 726/1 |
| 2007/0192825 A1* | 8/2007 | Frank | G06F 21/55 726/1 |
| 2008/0005077 A1* | 1/2008 | Eggebraaten | G06F 17/30309 |
| 2008/0016358 A1* | 1/2008 | Filreis | H04L 63/123 713/176 |
| 2008/0028235 A1* | 1/2008 | Smith | G06F 21/575 713/190 |
| 2008/0177769 A1* | 7/2008 | Albert | H04N 1/41 |
| 2008/0235445 A1* | 9/2008 | Kacin | G06F 9/4416 711/112 |
| 2009/0049309 A1* | 2/2009 | Brinker | G06F 21/57 713/189 |
| 2009/0110190 A1 | 4/2009 | Dolgunov et al. | |
| 2009/0287837 A1* | 11/2009 | Felsher | G06F 19/322 709/229 |
| 2010/0083254 A1* | 4/2010 | Takahashi | G06F 9/545 718/100 |
| 2011/0107395 A1* | 5/2011 | Takala | G06F 21/575 726/2 |
| 2011/0167198 A1* | 7/2011 | Soja | G06F 12/1425 711/103 |
| 2011/0167260 A1 | 7/2011 | Fanton et al. | |
| 2012/0047358 A1 | 2/2012 | Chung et al. | |
| 2013/0159021 A1* | 6/2013 | Felsher | G06F 19/322 705/3 |
| 2013/0268754 A1 | 10/2013 | Baltes et al. | |
| 2014/0082257 A1* | 3/2014 | Scouller | G06F 21/6218 711/103 |
| 2014/0122903 A1* | 5/2014 | Endo | G06F 21/602 713/193 |
| 2014/0365755 A1* | 12/2014 | Liu | G06F 21/572 713/2 |
| 2015/0154113 A1 | 6/2015 | Krieger | |
| 2015/0363599 A1* | 12/2015 | Hoyer | G06F 21/606 726/27 |
| 2016/0034289 A1* | 2/2016 | Amano | G06F 11/30 718/1 |
| 2016/0078251 A1* | 3/2016 | Soja | G06F 21/72 713/193 |
| 2016/0188896 A1* | 6/2016 | Zatko | G06F 21/6218 726/30 |
| 2016/0264071 A1 | 9/2016 | Ujiie et al. | |
| 2017/0041395 A1* | 2/2017 | Kupcu | H04L 67/1097 |
| 2017/0090909 A1* | 3/2017 | Guo | G06F 8/66 |
| 2017/0147356 A1* | 5/2017 | Kotary | G06F 21/575 |

OTHER PUBLICATIONS

Office action, Non-Final Rejection, U.S. Appl. No. 14/725,387, dated Dec. 21, 2016, 6 pages.

U.S. Appl. No. 14/725,387, Michael R. Grimes: "Boot Control Systems and Methods for Vehicles", filed May 29, 2015.

* cited by examiner

FAST SECURE BOOT FROM EMBEDDED FLASH MEMORY

BACKGROUND

Field of the Invention

This invention relates to non-volatile storage systems and, more particularly, to controlling access to non-volatile storage systems.

Description of the Related Art

In a typical processing application (e.g., an automotive application) a non-volatile memory (NVM) may be implemented in a stand-alone memory integrated circuit or may be embedded within other integrated circuits. The NVM is used to store information, such as boot instructions, configuration information (e.g., operational parameters or information related to security and access), or other types of information, that are accessed and used by a microcontroller or other processing circuit to perform various operations. To protect the integrity of that information, e.g., to prevent unauthorized software execution or attack by malware, a manufacturer may control access to the information stored in the NVM of a product. A user (e.g., a microcontroller or other control circuit of the associated system) may have limited or no access to the information unless the user or subsystem in communication with the user authenticates the contents of the NVM before providing access to the contents of the NVM. A security processor or other control logic calculates a message authentication code or secure hash based on an image retrieved from memory and compares that message authentication code or secure hash to a value stored in secure memory (i.e., tamper-proof memory). However, calculating a message authentication code or secure hash for a large image may take a substantial amount of time that exceeds the start-up requirements for a system in some applications. Accordingly, improved techniques for controlling access to information are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A technique that reduces the startup time of a processing system authenticates a proxy for an image stored in tracked memory instead of authenticating the image stored in the tracked memory. A controller generates an alteration log authentication code based on an alteration log that is updated prior to programming the image stored in tracked memory. The controller records an alteration log authentication code in secure memory. The alteration log is indirectly related to a most recent image stored in the tracked memory. Authentication of the image of the alteration log is used as a proxy for authentication of the image stored in tracked memory, which is performed only when the tracked memory is modified. Use of the contents of the alteration log as a proxy for the contents of tracked memory accelerates the startup time of the system.

Figure 1:
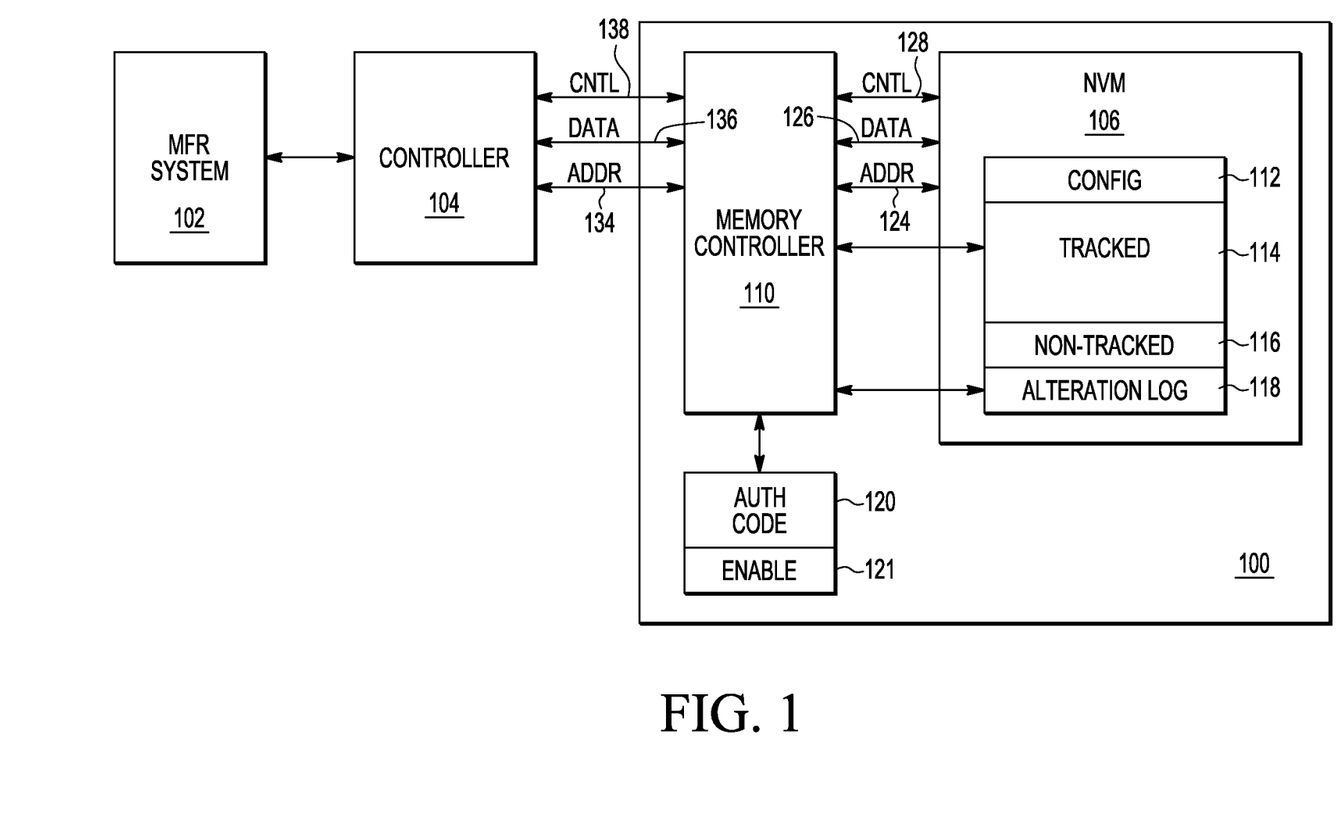
FIG. 1 illustrates a functional block diagram of an exemplary embodiment of a memory system using an authentication code for access to contents of non-volatile memory (NVM) of the memory system.

Referring to FIG. 1, exemplary memory system 100 includes memory controller 110 that facilitates access to NVM 106. Memory controller 110 communicates with NVM 106 to perform typical NVM operations using control signals (CNTL) 128, data signals (DATA) 126, and address signals (ADDR) 124. Memory controller 110 communicates with other external circuitry (e.g., controller 104 or other control or processor circuitry) using an interface, which includes control signals (CNTL) 138, data signals (DATA) 136, address signals (ADDR) 134 or other interface signals.

Non-volatile memory 106 includes a tracked memory 114 that is readable and writable via read/write commands provided to memory system 100 from controller 104. Tracked memory 114 may include boot code or other configuration information that is written by a manufacturer (e.g., a supplier or other suitable entity that configures the system prior to deployment in a target application and may provide updates to the system after the deployment), but later, may be overwritten by manufacturer-authorized patches or upgrades. Tracked memory 114 may include flash memory, magneto-resistive random-access memory (RAM), ferroelectric RAM (F-RAM), magnetic computer storage devices, optical discs, or any other suitable non-volatile memory that can store information even when not receiving power. The contents of NVM 106 may be written by the manufacturer directly, e.g., at a production facility. The contents of NVM 106 may be indirectly written by the manufacturer, in response to instructions received from manufacturer system 102. For example, manufacturer system 102 may use a communications link (e.g., transmission line or a wireless communications link) to communicate with controller 104.

Non-volatile memory 106 also includes alteration log 118, which may be one-time programmable read-only memory, a portion of which may not be readable by an application executing on controller 104 using typical read commands to NVM system 100. Non-volatile memory 106 may include one-time programmable read only memory (e.g., programmable read-only memory, field programmable read-only memory (FPROM), or one-time programmable non-volatile memory (OTP NVM)) and is a form of digital memory where the setting of each bit is locked by a fuse or anti-fuse. It is a type of read-only memory that is generally programmed after manufacture and once programmed, the stored data is permanent. Typical one-time programmable read-only memory has an initial state with all bits reading as '1,' and burning fuse bits during programming causes the bits to read as '0.' However, other embodiments of one-time programmable read-only memory have an initial state of all bits reading as '0,' and programming anti-fuses causes the bits to read as '1.' Blowing the fuses is an irreversible process that opens a connection, while programming an anti-fuse closes a connection. In general, a bit is programmed by applying a high-voltage pulse that is not used during normal operation across the gate and substrate of a transistor to break down the oxide between the gate and substrate. Memory controller 110 communicates with one-time programmable read-only memory in NVM 106 using control signals 128, data signals 126, and address signals 124, or by a separate interface.

Configuration region 112 may be implemented as a configuration register including a tracked region field, a one-time programmable region field, and a log region field. Contents of those fields may identify corresponding regions (e.g., tracked memory 114, non-tracked memory 116, and alteration log 118) in NVM 106. The tracked region stores information whose alteration needs to be tracked for a particular application. For example, in an automotive application, bits in the tracked region field identify locations that store configuration parameters for an engine control unit. Unauthorized changes to those configuration parameters may cause damage to an associated vehicle. If the automobile manufacturer or a related entity determines that unauthorized changes were made to the configuration parameters, they may void the warranty or refuse to service the automobile. In another example, the tracked region field specifies locations that have security and access control information for a consumer application.

The one-time programmable region field of configuration region 112 may identify storage locations of NVM 106 that cannot be programmed more than once. For example, in an automotive application, bits of the one-time programmable region field may identify locations that store system parameters that should never be changed, e.g., a vehicle identification number. In an exemplary consumer application, one-time programmable region field may identify locations that store information associated with the distributor of the consumer application device. The log region field of configuration region 112 identifies locations storing an alteration log corresponding to tracked memory 114. Configuration region 112 may also store a one-time programmed enabling key, which may be used to determine whether the use of the information stored in configuration register is enabled. Configuration region 112 may include other combinations of fields. In addition, configuration information could be predetermined or provided without the use of configuration register region 112.

Non-volatile memory 106 may include a flash memory where the request to modify would be the same as a request to erase. However, non-volatile memory 104 may include other forms of non-volatile storage where the request to modify may be the appropriate request for that type of storage. A mechanism prevents erasure of locations of tracked memory 114 until storage of a permanent record of the attempted modification. In response to receiving a request to modify one or more locations of tracked memory 114, memory controller 110 determines whether or not alteration log 118 has been appropriately modified (e.g., consistent with a particular format), and only allows modification of tracked memory 114 in response to a write to alteration log 118, which establishes a root of trust. If alteration log 118 has not been suitably written, memory controller 110 denies any a modification of tracked memory 114. Memory controller 110 allows modification of non-tracked region 116 whether or not the modification request is preceded by a write to alteration log 118. Techniques for tracking storage alteration are described in U.S. patent application Ser. No. 12/683,549, now U.S. Pat. No. 8,380,918, entitled "Non-Volatile Storage Alteration Tracking," filed Jan. 7, 2010, naming Richard Soja, James B. Eifert, and Timothy J. Strauss as inventors, which application is incorporated by reference herein.

During operation, controller 104 accesses memory system 100. When controller 104 accesses tracked memory 114, memory controller 110 authenticates the contents of tracked memory 114 before providing data to controller 104. The authentication includes a comparison of an authentication code generated using the contents of tracked memory 114 by memory controller 110 to a previously stored authentication code 120. If the comparison indicates that the generated authentication code is different from stored authentication code 120, memory controller 110 denies or limits access to the memory (e.g., a restricted boot load operation is allowed to occur). The authentication code may be a Message Authentication Code (MAC) or secure hash of the image stored in tracked memory 114. The authentication code may be determined by any suitable technique known in the art.

Figure 2:
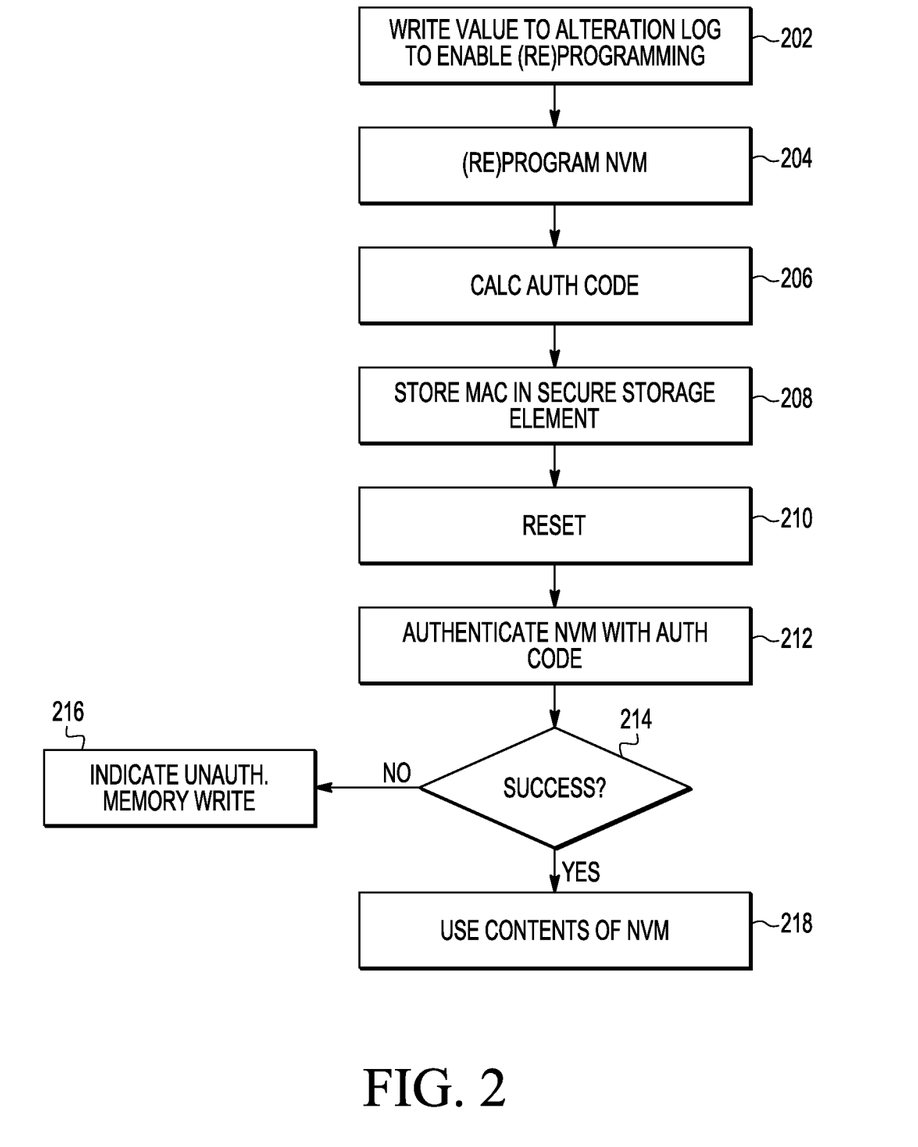
FIG. 2 illustrates information and control flows for memory system of FIG. 1.

Referring to FIGS. 1 and 2, initial programming or an update to tracked memory 114 requires controller 104 to write to alteration log 118 to enable programming (e.g., by setting or toggling an enable control bit in enable register 121) or to enable reprogramming of tracked memory 114, as the case may be (202). After successfully writing alteration log 118 to enable programming, controller 104 writes tracked memory 114 (204). Memory controller 110 calculates an authentication code based on the contents of tracked memory 114 using a hash, MAC, or other suitable technique (206) and stores the authentication code in secure storage element 120 (208). After a reset or other operation (210), which may occur when the device is deployed in the field, controller 104 attempts to access the image stored in tracked memory 114. In response to the memory request to tracked memory 114 from controller 104, memory controller 110 attempts to authenticate the image stored in tracked memory 114. For example, memory controller 110 computes an authentication code based on the current contents in tracked memory 114 and compares that computed authentication code to the authentication code previously stored in secure location 120. If the computed authentication code differs from the stored authentication code (214), memory controller 110 provides an indication to controller 104 that tracked memory 114 has been corrupted or sustained an unauthorized write (216). If tracked memory 114 stores boot code, rather than loading and executing a boot code image retrieved from tracked memory 114, controller 104 may execute a restricted startup routine or load alternate boot code from another location. If the computed authentication code is the same as the stored authentication code, the image successfully authenticates (214), and memory controller 110 provides the image from tracked memory 114 to controller 104, indicates successful authentication, and controller 104 continues with normal operation (218). Calculating an authentication code (e.g., MAC or secure hash) for the contents of tracked memory 114 may take a substantial amount of time that exceeds the performance requirements for a system in some applications (e.g., start-up of an engine controller in an automotive application). For example, calculating a message authentication code over 3 Megabytes of code may take 70 milliseconds using a high performance hardware accelerator operating at 120 MHz, which may be a substantial percentage of a startup time budget of an engine controller after a key-on event.

Figure 3:
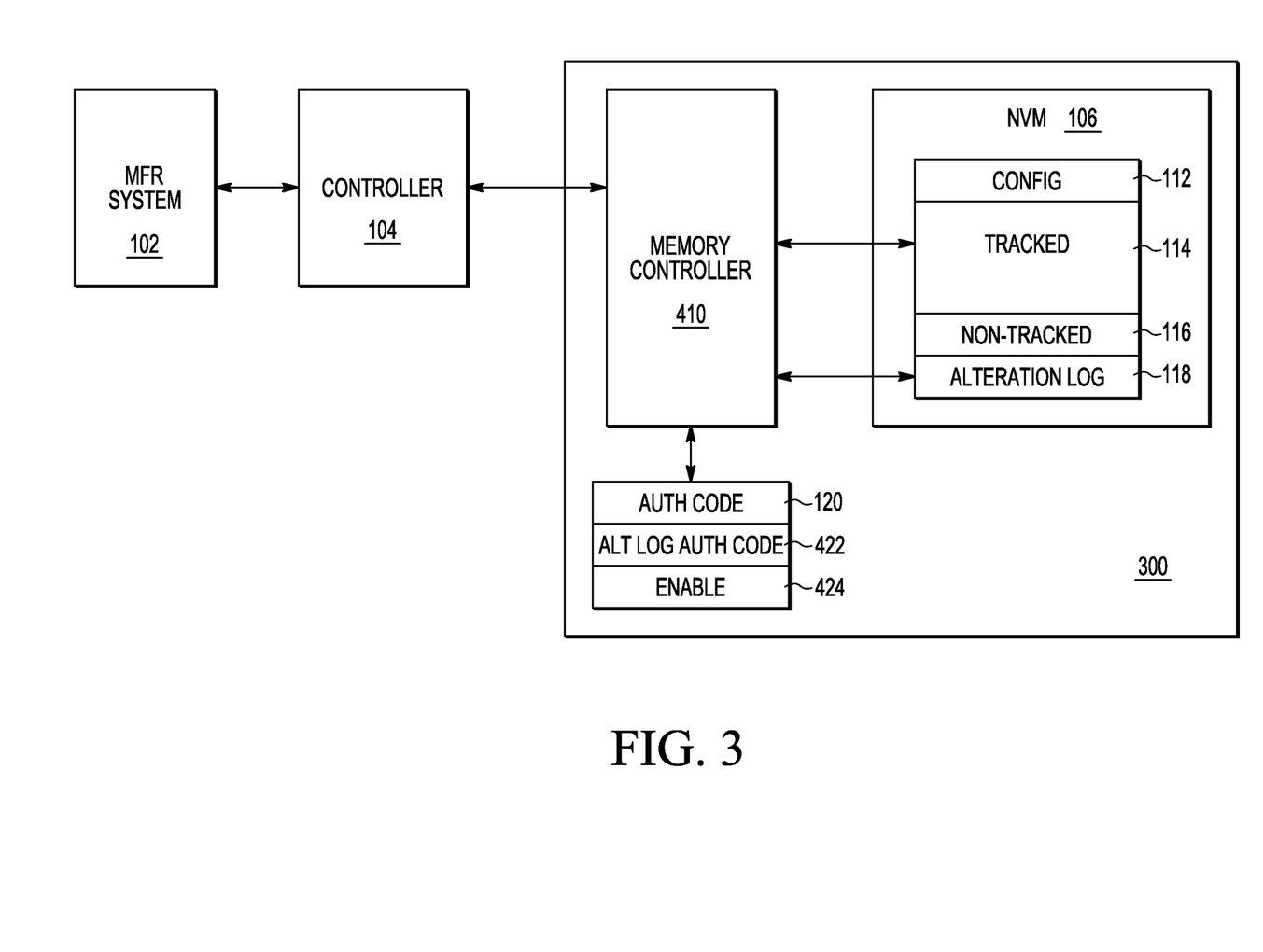
FIG. 3 illustrates a functional block diagram of an exemplary embodiment of an NVM system using an authentication code for access to contents of the NVM consistent with at least one embodiment of the invention.

Referring to FIG. 3, rather than use the authentication code computed using the entire image stored in tracked memory 114, to authenticate subsequent accesses to tracked memory 114 (e.g., reads subsequent to a write to tracked memory 114), memory system 300 computes an authentication code based on the contents of alteration log 118 and stores that alteration log authentication code in a separate secure memory location that is not visible to applications executing on controller 104. Since alteration log 118 is updated each time tracked memory 114 is properly updated, the contents of alteration log 118 correspond to the current contents of tracked memory 114. Therefore, the contents of alteration log 118 may be used as a proxy for the image of tracked memory 114. Accordingly, memory controller 410 performs a modified alteration and authentication technique.

Figure 4:
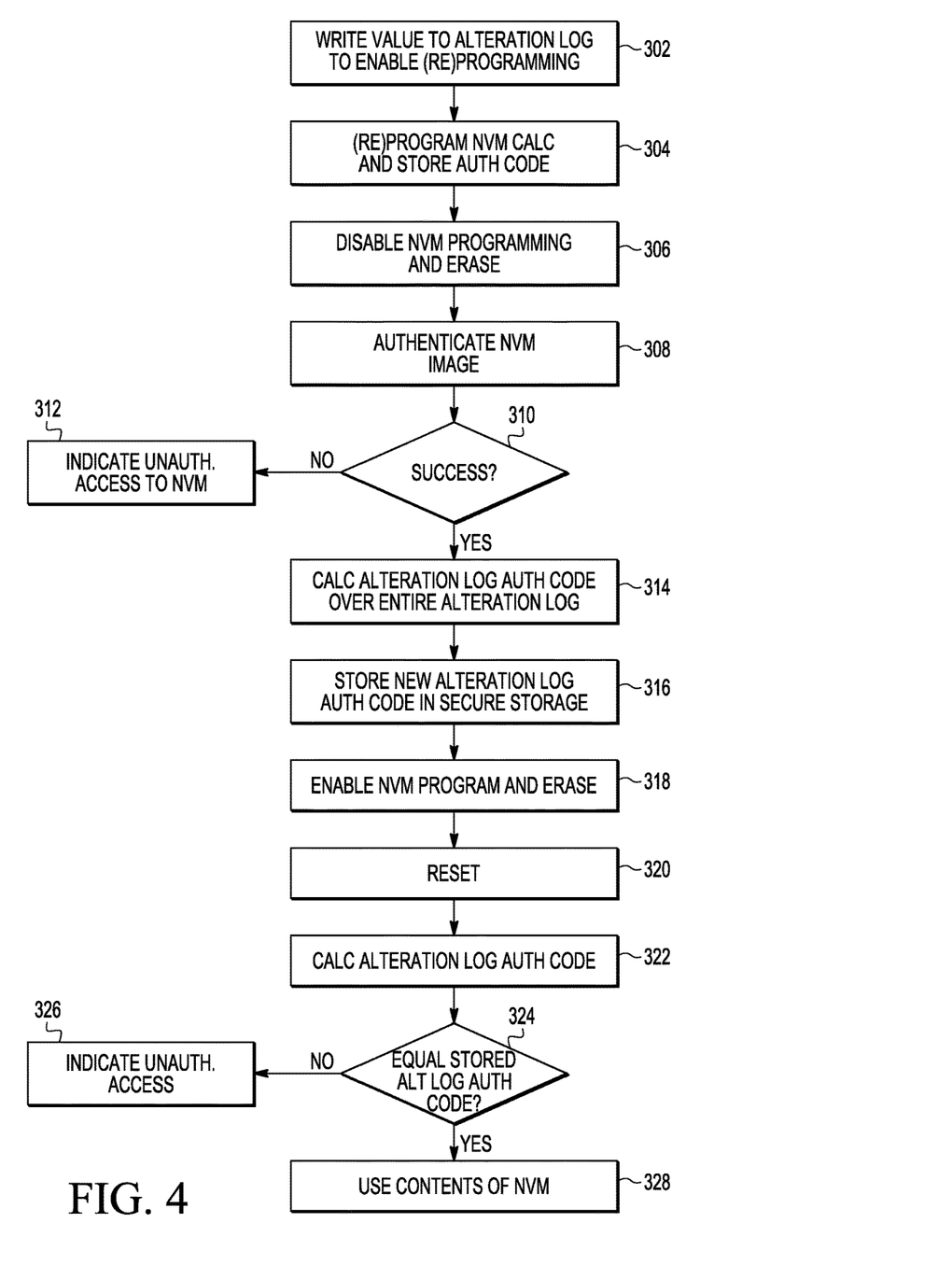
FIG. 4 illustrates information and control flows for the memory system of FIG. 3, consistent with at least one embodiment of the invention.

Referring to FIGS. 3 and 4, in at least one embodiment, memory controller 410 writes to alteration log 118 to enable programming of tracked memory 114, or e.g., by setting enable flag 424 (302). After successfully writing alteration log 118 and enabling programming, memory controller 410 programs or reprograms tracked memory 114 (304). Then, memory controller 410 calculates an authentication code based on the contents of tracked memory 114 and stores the authentication code in secure storage element 120 (304). Memory controller 410 disables programming or erase capability of tracked memory 114 (306). After reset or other operations, memory controller 410 accesses that image stored in tracked memory 114 and attempts to authenticate the image in tracked memory 114. For example, memory controller computes an authentication code based on the contents in tracked memory 114 and compares the computed authentication code to a stored authentication code in secure location 120 (308). If the computed authentication code differs from the stored authentication code (310), memory controller 410 provides an indication to controller 104 that the write to tracked memory 114 has been corrupted or sustained an unauthorized write (312). In response, controller 104 may execute another write sequence to correct the image or redirect memory access to other memory. If the computed authentication code is the same as the stored authentication code, the image successfully authenticates (310). Then, memory controller 410 calculates an alteration log authentication code based on the contents of alteration log 118 (314) and stores the alteration log authentication code in secure storage 422 (316). Memory controller 410 then enables tracked memory program and erase for regular system operations (318).

After a reset or other system operations (320), which may occur when the device is deployed in the field, controller 104 accesses the image stored in tracked memory 114. In response to the memory request to tracked memory from controller 104, memory controller 410 attempts to authenticate the image in alteration log 118. For example, memory controller computes an alteration log authentication code based on the current contents of alteration log 118 and compares the computed alteration log authentication code to a stored alteration log authentication code stored in secure location 422. If the computed authentication code differs from the stored alteration log authentication code (324), memory controller 410 provides an indication to controller 104 that tracked memory 114 has been corrupted or sustained an unauthorized write (326). If tracked memory 114 stores boot code, rather than loading and executing the boot code image from tracked memory 114, controller 104 may execute a restricted startup routine or load alternate code from another location. If the computed alteration log authentication code is the same as the stored alteration log authentication code, the image successfully authenticates (324), and memory controller 410 provides the image of tracked memory 114 to controller 104, indicates successful authentication, and controller 104 continues with normal operation (328). Calculating an alteration log authentication code for alteration log 118 is substantially quicker than calculating an authentication code for the image of tracked memory 114. For example, in an engine control application, authentication using the image of alteration log 118 as a proxy for the image of tracked memory 114 may be at least one order of magnitude (e.g., 500 times) faster than authentication using the image of tracked memory 114. Note that other operations may occur in the sequence of FIG. 4 and the sequence of operations of FIG. 4 may vary. In at least one embodiment, memory controller 410 indicates the result of the authentication process on external pins on the device by setting the state of one or more pins to represent success or failure of the authentication process.

In at least one embodiment of the invention, a method includes determining an alteration log authentication code based on contents of an alteration log associated with a tracked region of memory. The method includes generating an indication of authentication of the contents of the tracked region of memory based on a comparison of the alteration log authentication code to a stored alteration log authentication code. The method may include after storing a stored authentication code determined based on contents of the tracked region of memory, disabling modification of the tracked region of memory. The method may include generating a second indication of authentication of the contents of the tracked region of memory based on a comparison of the stored authentication code to a determined authentication code. The method may include in response to a successful authentication of entries of the tracked region of memory with a stored authentication code, determining the stored alteration log authentication code based on the alteration log associated with the tracked region of memory. The method may include storing the stored alteration log authentication code in a secure storage element. The method may include after storing the stored alteration log authentication code, enabling modification of the tracked region of memory.

In at least one embodiment of the invention, an apparatus includes a storage module comprising a tracked region, an alteration log associated with the tracked region, and control logic configured to selectively provide access to the tracked region based on an indication of a comparison of an alteration log authentication code to a stored alteration log authentication code. The control logic may be further configured to disable modification of the tracked region of memory after storing a stored authentication code determined based on contents of the tracked region of memory, generate a second indication of authentication based on a comparison of the stored authentication code to a determined authentication code, determine the stored alteration log authentication code based on the alteration log associated with the tracked region of memory in response to a successful authentication of entries of the tracked region of memory with a stored authentication code, store the stored alteration log authentication code in a secure storage element, and enable modification of the tracked region of memory after storing the stored alteration log authentication code. The apparatus may include a storage element configured to store the alteration log authentication code based on contents of the alteration log.

In at least one embodiment of the invention, a method includes after storing a stored authentication code determined based on contents of the tracked region of memory, disabling modification of the tracked region of memory. The method includes generating an indication of authentication of the contents of the tracked region of memory based on a comparison of the stored authentication code to a determined authentication code. The method includes in response to a successful authentication of the contents of the tracked region of memory, determining a stored alteration log authentication code based on an alteration log associated with the tracked region of memory. The method includes storing the stored alteration log authentication code in a secure storage element. The method may include, after storing the stored alteration log authentication code, enabling modification of the tracked region of memory. The method may include determining an alteration log authentication code based on contents of an alteration log associated with a tracked region of memory. The method may include generating an indication of authentication of the contents of the tracked region of memory based on a comparison of the alteration log authentication code to a stored alteration log authentication code.

Although the invention is described herein with reference to specific embodiments, various modifications and changes can be made without departing from the scope of the present invention as set forth in the claims below. For example, while the invention has been described in an embodiment in which the tracked memory is non-volatile memory, one of skill in the art will appreciate that the teachings herein can be utilized with volatile memory that continuously receive power. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for controlling access to memory comprising:
   determining an alteration log authentication code based on contents of an alteration log associated with a tracked region of memory, modification of the tracked region of memory being enabled by a write to the alteration log; and
   generating an indication of authentication of contents of the tracked region of memory based on a comparison of the alteration log authentication code to a stored alteration log authentication code; and
   selectively providing access to the contents of the tracked region of memory in response to the indication.

2. The method, as recited in claim 1, further comprising:
   after storing an authentication code determined based on contents of the tracked region of memory, disabling modification of the tracked region of memory; and
   generating a second indication of authentication of the contents of the tracked region of memory based on a comparison of the stored authentication code to a determined authentication code.

3. The method, as recited in claim 1, further comprising:
   in response to a successful authentication of entries of the tracked region of memory with a stored authentication code, determining the stored alteration log authentication code based on the alteration log associated with the tracked region of memory; and
   storing the stored alteration log authentication code in a secure storage element.

4. The method, as recited in claim 3, further comprising:
   after storing the stored alteration log authentication code, enabling modification of the tracked region of memory.

5. The method, as recited in claim 1, wherein the alteration log is at least one order of magnitude smaller than the tracked region of memory.

6. The method, as recited in claim 1, wherein the alteration log is stored in one-time programmable memory.

7. The method, as recited in claim 1, wherein contents of the tracked region of memory include boot code and the method further comprises:
   executing a restricted startup in response to the indication indicating an unsuccessful authentication.

8. The method, as recited in claim 1, further comprising:
   accessing the contents of the tracked region of memory in response to the indication having a value indicating a successful authentication.

9. The method, as recited in claim 1, further comprising:
   enabling modification of the tracked region of memory in response to a write to the alteration log.

10. An apparatus comprising:
    a storage module comprising a tracked region;
    an alteration log associated with the tracked region, modification of the tracked region being enabled by a write to the alteration log; and
    control logic configured to selectively provide access to the tracked region based on an indication of a comparison of an alteration log authentication code to a stored alteration log authentication code, the alteration log authentication code being generated based on contents of the alteration log.

11. The apparatus, as recited in claim 10, wherein the control logic is further configured to disable modification of the tracked region after storing an authentication code determined based on contents of the tracked region, generate a second indication of authentication based on a comparison of the stored authentication code to a determined authentication code, determine the stored alteration log authentication code based on the alteration log associated with the tracked region in response to a successful authentication of entries of the tracked region with a stored authentication code, store the stored alteration log authentication code in a secure storage element, and enable modification of the tracked region after storing the stored alteration log authentication code.

12. The apparatus, as recited in claim 10, further comprising:
    a storage element configured to store the alteration log authentication code based on contents of the alteration log.

13. The apparatus, as recited in claim 10, wherein the alteration log is at least one order of magnitude smaller than the tracked region of the storage module.

14. The apparatus, as recited in claim 10, wherein the alteration log comprises a non-erasable one-time-programmable memory.

15. A method comprising:
- after storing an authentication code determined based on contents of a tracked region of memory, disabling modification of the tracked region of memory;
- generating an indication of authentication of contents of the tracked region of memory based on a comparison of the stored authentication code to a determined authentication code; and
- in response to a successful authentication of contents of the tracked region of memory with the stored authentication code, determining an alteration log authentication code based on an alteration log associated with the tracked region of memory, modification of the tracked region of memory being enabled by a write to the alteration log; and
- storing the alteration log authentication code in a secure storage element.

16. The method, as recited in claim 15, further comprising:
- after storing the alteration log authentication code, enabling modification of the tracked region of memory.

17. The method, as recited in claim 15, further comprising:
- determining a second alteration log authentication code based on the contents of the alteration log associated with the tracked region of memory; and
- generating a second indication of authentication of contents of the tracked region of memory based on a comparison of the second alteration log authentication code to the stored alteration log authentication code.

18. The method, as recited in claim 15, wherein the alteration log is at least one order of magnitude smaller than the tracked region of memory.

19. The method, as recited in claim 15, wherein the alteration log is stored in one-time programmable memory.

20. The method, as recited in claim 15, further comprising:
- accessing contents of the tracked region of memory in response to the indication having a value indicating a successful authentication.

21. The method, as recited in claim 1, wherein the alteration log includes one-time programmable bits storing data consistent with a predetermined format and written prior to storage of a most recent image in the tracked region of memory.

22. The method, as recited in claim 1, wherein the contents of the alteration log are used as a proxy for the contents of the tracked region of memory for authentication of an access to the tracked region of memory.

* * * * *